United States Patent
Petricoin, Jr. et al.

(10) Patent No.: US 8,634,720 B2
(45) Date of Patent: Jan. 21, 2014

(54) REMOTE CONTROL RELAY FOR WIRELESSLY-CONTROLLED DEVICES

(75) Inventors: Dennis Michael Petricoin, Jr., Hemlock, NY (US); Ron Johan, Queens Pk NSW (AU)

(73) Assignee: Robert Bosch GmbH, Stuttgart (DE)

( * ) Notice: Subject to any disclaimer, the term of this patent is extended or adjusted under 35 U.S.C. 154(b) by 1394 days.

(21) Appl. No.: 12/038,926

(22) Filed: Feb. 28, 2008

(65) Prior Publication Data

US 2009/0220243 A1   Sep. 3, 2009

(51) Int. Cl.
*H04B 1/00* (2006.01)
*H04B 1/20* (2006.01)

(52) U.S. Cl.
CPC ..................................... *H04B 1/202* (2013.01)
USPC ............ 398/128; 398/126; 398/127; 398/130

(58) Field of Classification Search
USPC .................... 340/521–541; 398/126–128, 130
See application file for complete search history.

(56) References Cited

U.S. PATENT DOCUMENTS

| | | | | |
|---|---|---|---|---|
| 4,394,691 A | * | 7/1983 | Amano et al. | 348/734 |
| 4,727,600 A | * | 2/1988 | Avakian | 398/126 |
| 5,218,356 A | * | 6/1993 | Knapp | 342/350 |
| 5,566,022 A | * | 10/1996 | Segev | 398/107 |
| 6,481,013 B1 | * | 11/2002 | Dinwiddie et al. | 725/80 |
| 6,792,319 B1 | | 9/2004 | Bilger | |
| 6,912,429 B1 | | 6/2005 | Bilger | |
| 6,967,565 B2 | | 11/2005 | Lingemann | |
| 7,030,752 B2 | * | 4/2006 | Tyroler | 340/531 |
| 7,135,985 B2 | | 11/2006 | Woolgar et al. | |
| 7,136,709 B2 | | 11/2006 | Arling et al. | |
| 7,184,848 B2 | | 2/2007 | Krzyzanowski et al. | |
| 7,187,279 B2 | | 3/2007 | Chung | |
| 7,194,209 B1 | * | 3/2007 | Robbins et al. | 398/127 |
| 7,266,301 B2 | * | 9/2007 | Stanchfield et al. | 398/126 |
| 7,269,416 B2 | * | 9/2007 | Guthrie et al. | 455/420 |
| 7,787,776 B2 | * | 8/2010 | Sharma | 398/151 |
| 2005/0026605 A1 | * | 2/2005 | Guthrie et al. | 455/420 |
| 2005/0053378 A1 | * | 3/2005 | Stanchfield et al. | 398/115 |
| 2005/0246408 A1 | | 11/2005 | Chung | |
| 2005/0267605 A1 | | 12/2005 | Lee et al. | |
| 2006/0092953 A1 | * | 5/2006 | Haverinen et al. | 370/400 |
| 2006/0229746 A1 | | 10/2006 | Ollis et al. | |
| 2008/0030328 A1 | * | 2/2008 | Sharma | 340/552 |
| 2008/0031206 A1 | * | 2/2008 | Sharma | 370/338 |

* cited by examiner

*Primary Examiner* — Danny Leung
(74) *Attorney, Agent, or Firm* — Michael Best & Friedrich LLP

(57) ABSTRACT

Methods and systems for relaying an optical signal from a remote control to a remote-controlled device such as a home entertainment device or a security device. Embodiments include at least one optical receiver and a plurality of optical transmitters. The optical transmitter positioned with an unobstructed line-of-sight to the home entertainment device is identified and the data encoded in the optical signal from the remote control is sent to that transmitter. A second optical signal that is substantially identical to the first is then generated at the optical transmitter and communicated to the home entertainment device.

20 Claims, 6 Drawing Sheets

REMOTE CONTROL RELAY FOR WIRELESSLY-CONTROLLED DEVICES

BACKGROUND OF INVENTION

The invention relates generally to the remote control of home entertainment devices and other similar devices. In particular, the invention relates to remote control of devices from a location outside the normal range of a typical remote control.

Universal remote controls that generate the same type of signal in response to a depressed button that would have been generated by a home entertainment device's original remote control are known. Home automation systems that provide a central control system for home entertainment devices, light/climate control, and control of other home electronic systems are also known. In these systems, a central command center or user interface (such as a wall-mounted control panel) is often hard-wired to the devices that a user desires to control.

SUMMARY OF INVENTION

Although remote controls are known, many of them are incapable of operating properly unless a clear line of sight exists between the remote control and the device being controlled. In a typical remote control, an infrared (IR) or near infrared light emitting diode is pulsed (i.e., switched on and off) to encode digital data. The encoded data typically includes the command instruction to be executed (e.g. "Volume Up") and a device identifier. The device identifier allows a device to differentiate between instructions that it must execute and instructions that it must ignore. Thus, for example, a remote control for an audio amplifier/receiver will not (normally) control (for example, turn on and off) a television located nearby.

Although IR technology can be used to remotely control multiple devices, IR remotes are not suitable in all situations. First, as already noted, most IR remotes will not operate properly unless a clear line of sight is provided between the remote control and the device being controlled. This is true because IR signals tend to be directional in nature (as opposed to omni-directional) and because IR signals can be obstructed and do not, for example, pass through humans, walls, furniture, and other items. The IR signals generated by many remote controls also have a limited range, which is approximately 30 feet in many instances.

However, modern devices, such as home entertainment systems, are often distributed in multiple locations and configured to be viewed or listened to while a person moves throughout multiple rooms. For example, sound generated by a single audio system can be heard throughout a home even though the main component of the audio system (for example, the amplifier) is physically located in only one room. Since, IR remote controls have a limited range and their signals are easily obstructed, the use of such remotes in multi-room systems is of limited benefit, because the remote control will not operate unless the user of the remote control is located relatively close and in a clear line of sight to the device being controlled.

Home automation systems that are manipulated from a command center or control panel do not adequately solve this problem, because, among other things, (1) the control panels often do not have an IR receiver to receive signals from an IR remote control, (2) the control panels are often located far away from the devices to be controlled, which means that they are often located outside of the signal range of an IR remote control, (3) many devices are now controllable only through a device-specific remote control and configuring command centers to be responsive to each remote control of each device that might be added to an entertainment or other system can be expensive in terms of both time and money.

Embodiments of the invention provide systems and methods for relaying a remote control signal from a standard remote control to the corresponding home entertainment device when the line of sight between the remote control and the home entertainment device is obstructed. The home entertainment device may be a television, an audio amplifier, a DVD player, or other device operated by a remote control.

In some embodiments, an IR signal emitted from the remote control is received by an IR receiver and communicated to an IR transmitter. The IR transmitter generates an identical IR signal and, because it is positioned in an unobstructed line-of-sight with the home entertainment device, this second IR signal is communicated to the home entertainment device.

In some embodiments, multiple IR transmitter/receivers are connected to a controller. The controller analyzes the received signal to identify the corresponding target device, identifies the IR transmitter positioned in an unobstructed line-of-sight with the target device, and replicates the signal at that transmitter.

In some embodiments, the remote control relay system is part of a security system. In such embodiments, security system control panels placed throughout a building are each equipped with an IR receiver/transmitter.

In some embodiments, the communication between the IR receiver, the IR transmitter, and the security system central controller is accomplished using wireless communication technology. In other embodiments, this communication is accomplished using wired serial cables. In still other embodiments, other communication technologies or various combinations are implemented.

In some embodiments, one or more IR transmitters are placed in an unobstructed line-of-sight with a plurality of home entertainment devices. In these embodiments, the IR receiver receives an IR signal from any of a plurality of remote controls and the system relays the IR signal to one of the plurality of home entertainment devices.

DETAILED DESCRIPTION

Figure 1:
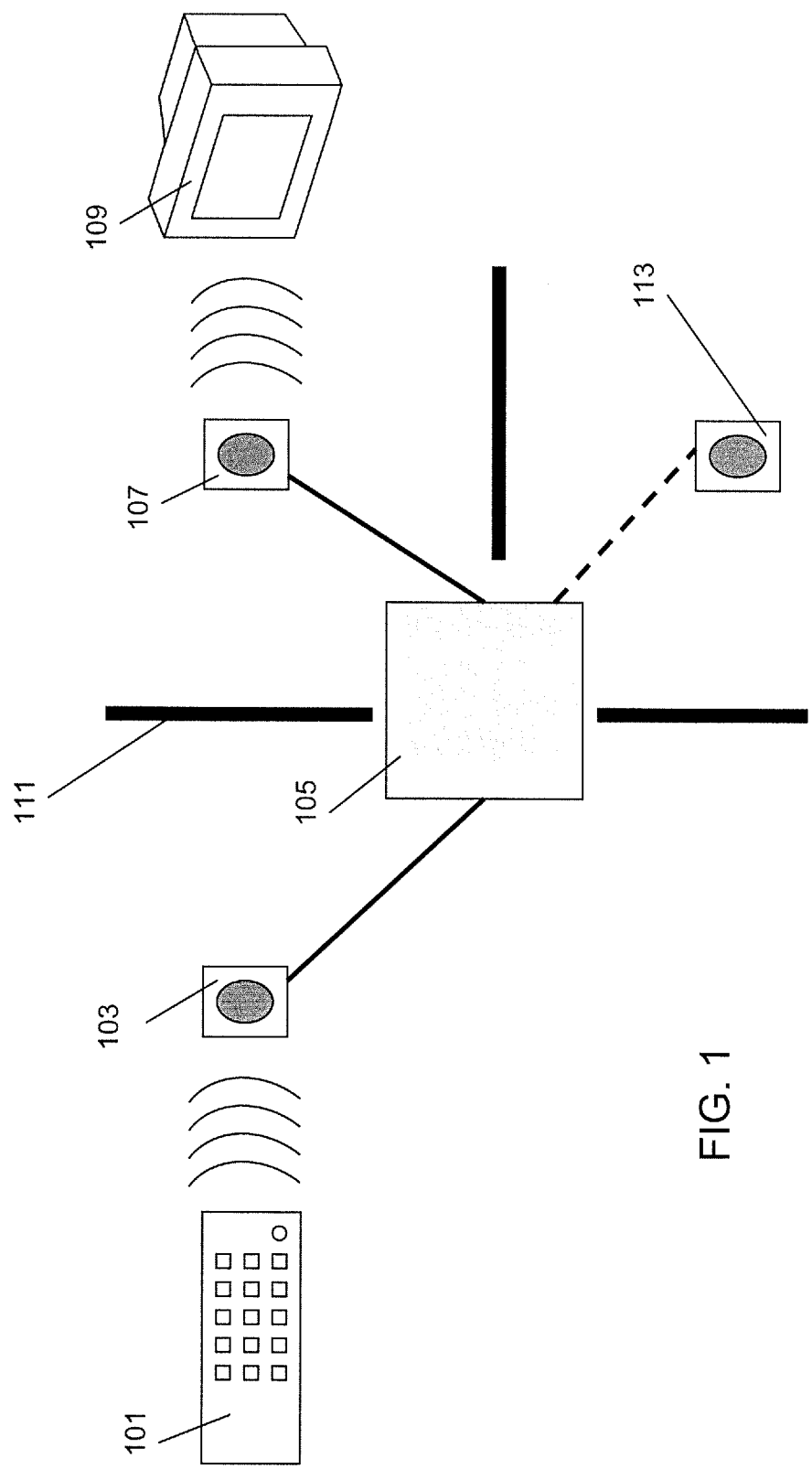
FIG. 1 illustrates interconnected components in one embodiment of the invention where an IR receiver and at least one IR transmitter are coupled to a controller.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. It should be noted that a plurality of hardware and software based devices, as well as a plurality of different structural components, may be utilized to implement embodiments of the invention. Furthermore, and as described in the subsequent paragraphs, the specific configurations illustrated in the drawings are intended to exemplify embodiments of the invention, and other alternative configurations are possible.

As discussed above, pulsed IR is currently the predominant standard for communication between a remote control and a wirelessly-controlled device, such as a home entertainment device. However, other methods of optical communication will similarly benefit from the invention described herein.

An interconnection of components in a home entertainment system is illustrated in FIG. 1. Remote control 101 is attempting to send a signal to television 109; however, the line-of-sight is obstructed by obstruction 111. Instead of the signal directly reaching television 109, the signal from the remote control 101 reaches IR receiver 103. IR receiver 103 is coupled to system controller 105 which is coupled in turn to IR transmitter 107. The signal originally generated by remote control 101 is replicated at IR transmitter 107 and transmitted by the IR transmitter 107. Because the line-of-sight between IR transmitter 107 and television 109 is unobstructed, the replicated signal is received by television 109. Additional IR transmitters and receivers (such as transmitter/receiver 113) may be coupled to system controller 105.

System controller 105 may be a stand-alone controller design specifically for controlling a home entertainment relay system. Alternatively, it may be a standard personal computer running software. As described below, system controller 105 and the IR transmitters/receivers (103, 107, and 113) may also be integrated within a building's security system.

Figure 2:
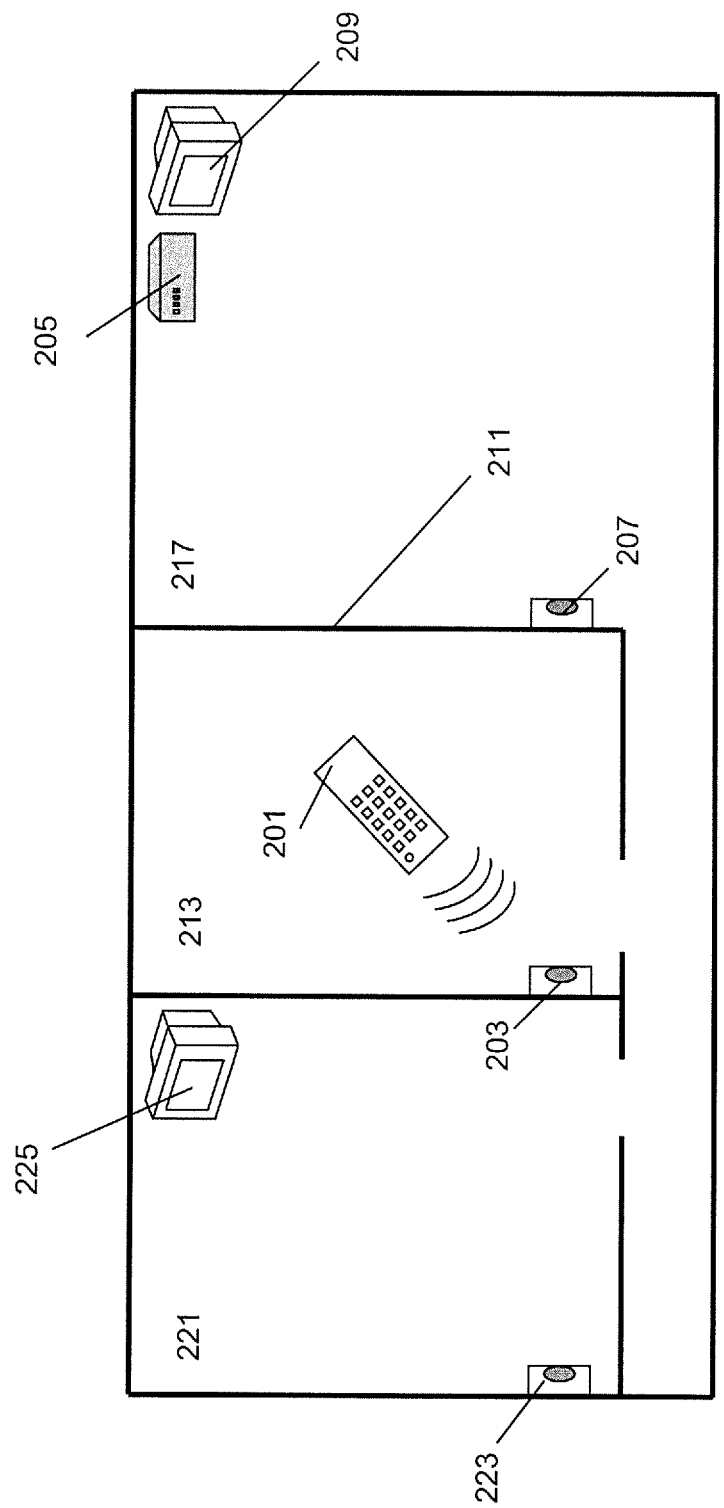
FIG. 2 provides an overhead view of one embodiment of the invention installed in a building.

FIG. 2 demonstrates an example of how the embodiment described in FIG. 1 is installed in a building. The building has three rooms (221, 213, and 217) each with an IR transmitter/receiver (223, 203, and 207 respectively). Room 221 contains a first television 225. Room 217 contains a second television 209. A person is located in room 213 with remote control 201. System controller 205 is located in room 217.

Consider, for example, that remote control 201 is configured to control television 209. The person in room 213 wants to increase the volume on television 209, but wall 211 obstructs the optical communication between remote control 201 and television 209. According to this embodiment, the person points remote control 201 at IR transmitter/receiver 203 and the IR signal is replicated at IR transmitter/receiver 207 in room 217. Because the line-of-sight between IR transmitter/receiver 207 and television 209 is unobstructed, the command is communicated and the volume on television 209 is increased.

Figure 3:
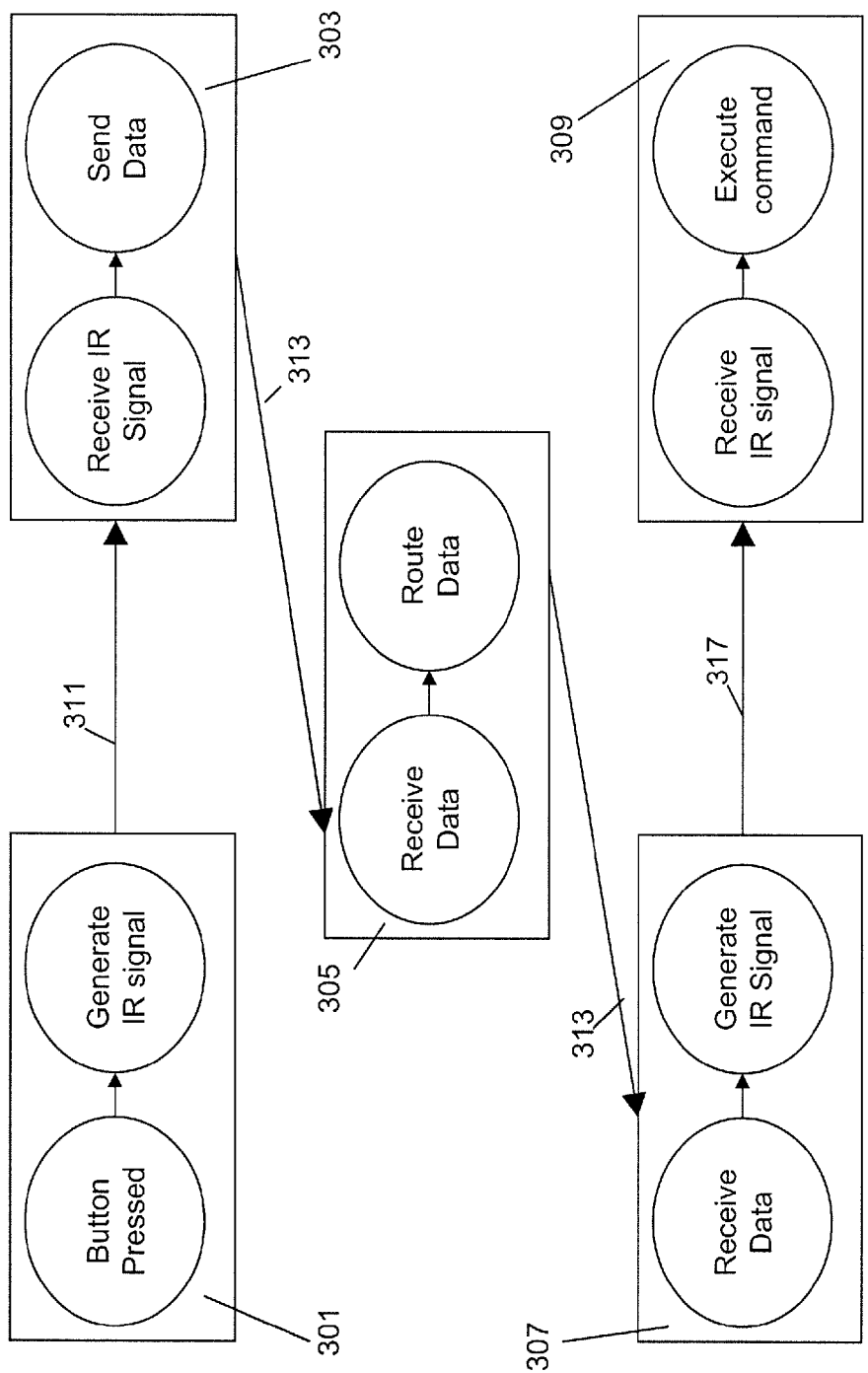
FIG. 3 illustrates the operational flow of data in one embodiment of the invention.

The operational flow of data can be better understood with reference to FIG. 3. Similar reference characters are used to refer to similar objects. When the person presses the button on remote control 301, a digitally-encoded infrared signal 311 is generated by an LED located in remote control 301. This infrared signal 311 is received by IR transmitter/receiver 303 and the optical encoding is translated into electronic data 313 and sent to system controller 305. Depending on the communication infrastructure used, the electronic data 313 may be sent via a wired link (such as an RS-232 link) or wirelessly (by using, e.g., a radio frequency (RF) or Bluetooth® link).

System controller 305 may include a programmable unit that performs intelligent routing (such as described below) or it may include simple routing that forwards the electronic data 313 to all connected transmitters. In either case, the electronic data 313 is received by IR transmitter/receiver 307 which then generates an IR signal 317 that is substantially identical to IR signal 311. The home entertainment device 309 receives the IR signal 317 and executes the command as though it had been sent directly from remote control 301.

Figure 4:
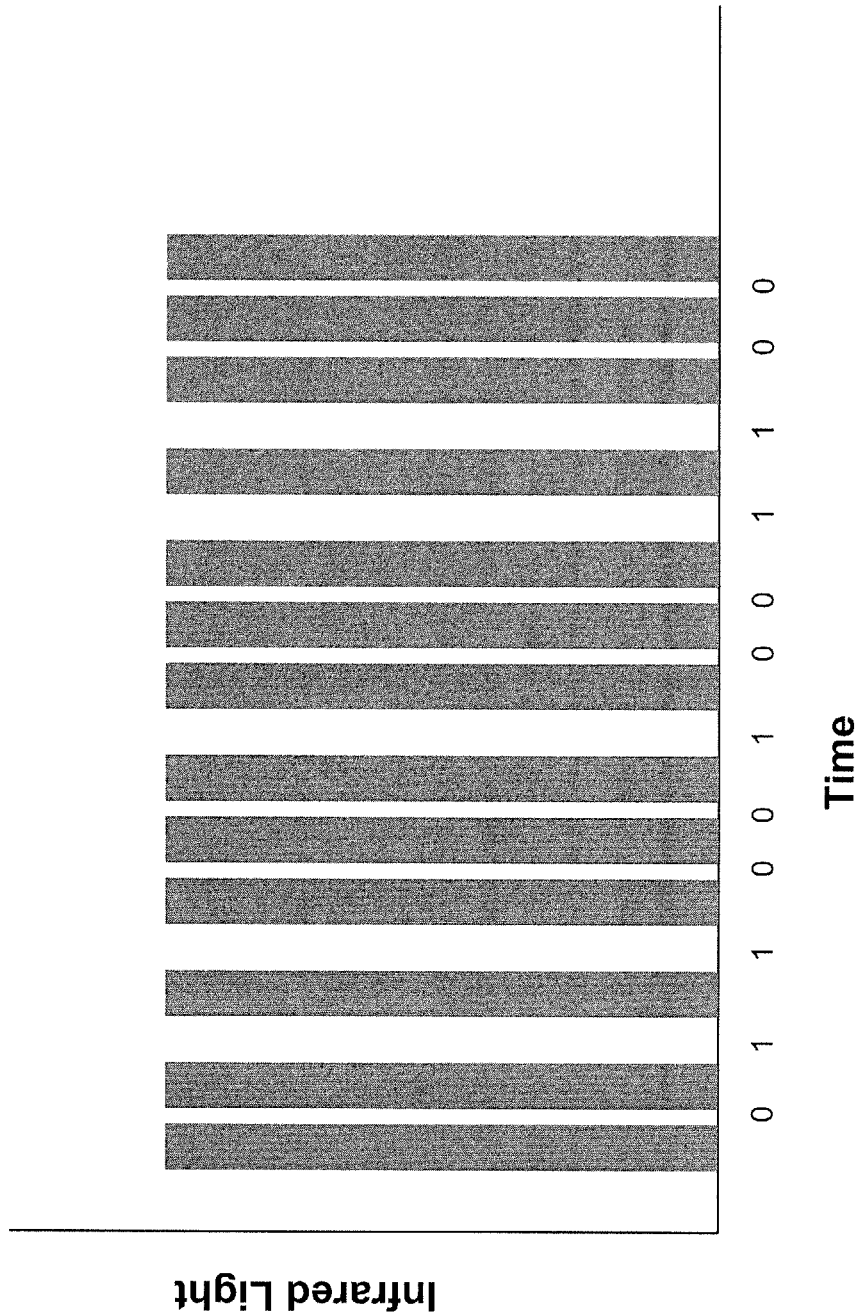
FIG. 4 illustrates an example of digital encoding in an IR remote control. The graph plots light amplitude as a function of time.

As referred to above, the LED in a remote control (such as 101, 201, or 301) generates a digitally-encoded IR signal. Such a signal is created by rapidly pulsing the LED on and off. Digital information is encoded in the optical transmission by varying pulse frequency. The encoding demonstrated in FIG. 4 uses "space coding" wherein the amount of time between pulses represents a one (short time period) or a zero (longer time period). The pulse sequence in FIG. 4, therefore, represents the twelve-bit signal 0110 0100 1100. The encoded signal usually includes both a command and a device identifier. For example, the 0110 0100 may represent the 8-bit command for "Channel Up" and the 1100 may represent the 4-bit device identifier for the television. Referring back to FIG. 2, the device identifier allows television 209 to recognize that it must execute the "Channel Up" command while television 225 recognizes that it must ignore any signal it receives that is intended for television 209.

Figure 5:
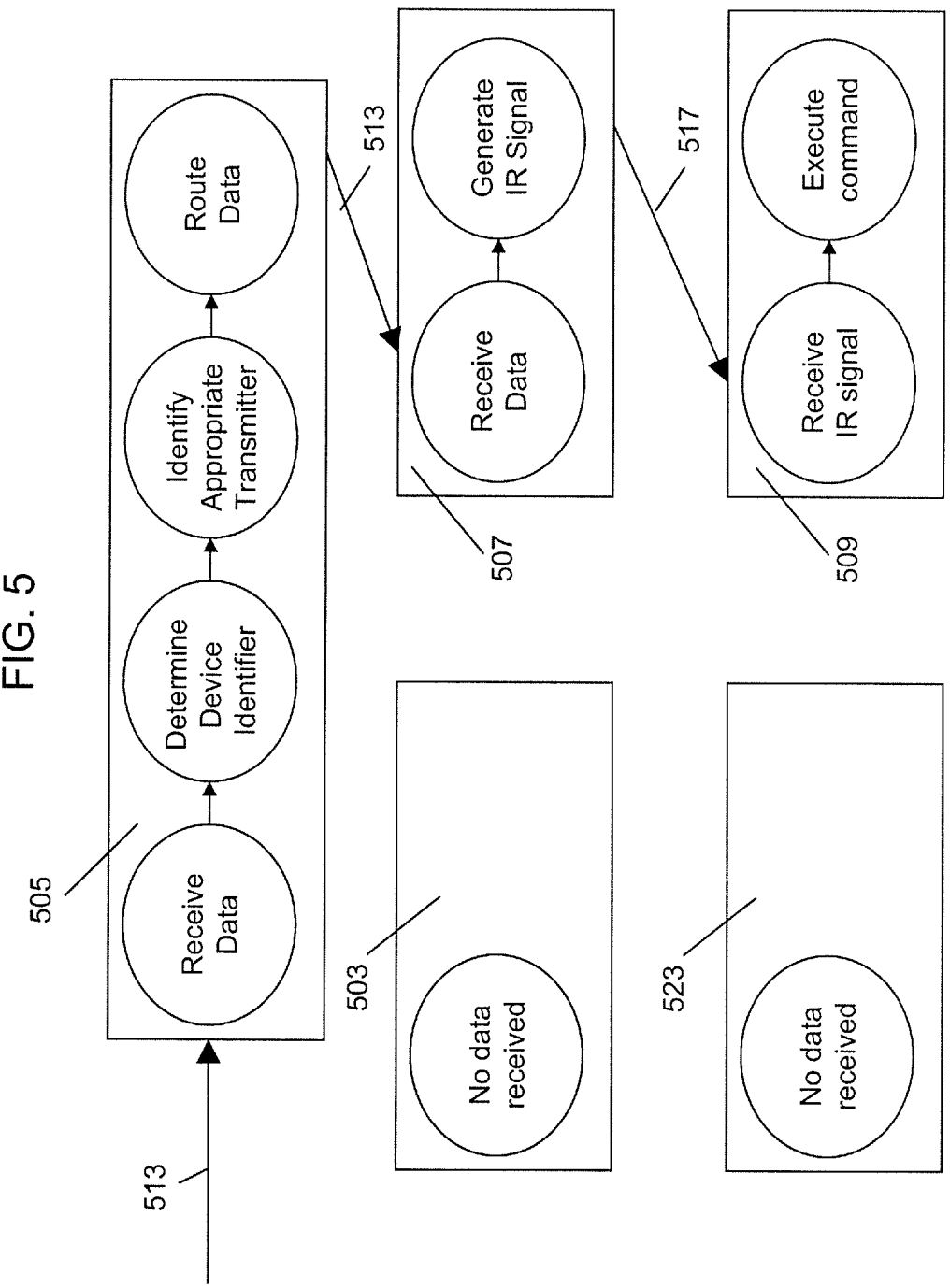
FIG. 5 illustrates the operational flow of data according to one embodiment of the invention where the system includes multiple IR transmitters.

As mentioned above, in various embodiments the system controller (such as 105 or 205) is programmed for intelligent data routing. An example of such routing is illustrated in FIG. 5. System controller 505 receives the electronic data 513 and determines the device identifier. System controller 505 identifies the transmitter with the shortest unobstructed line-of-sight to the home entertainment device and routes the electronic data 513 only to that IR transmitter/receiver 507. IR transmitter/receiver 507 then generates an IR signal 517 that is substantially identical to the original IR signal generated by the remote control (not pictured). The home entertainment device 509 receives the IR signal 517 and executes the command as though it had been sent directly from the remote control. Because IR transmitter/receivers 503 and 523 do not receive electronic data 513, they do not generate IR signals.

System controller 505 is programmed to include a list of all home entertainment devices in the building (listed by their device identifier) and the corresponding IR transmitter/receiver (such as 503, 507, and 523). When system controller 505 receives the device identifier in electronic data 513, it locates the appropriate sensor by accessing this list.

In some embodiments, this list is populated by monitoring for new unknown IR signals. For example, referring generally now to FIG. 2, when the user purchases and installs television 209 in room 217, the corresponding remote control is typically first used in room 217. IR transmitter/receiver 207 detects this new IR signal. Because system controller 205 cannot identify the appropriate IR transmitter/receiver to route the encoded data, it automatically assumes that a new device is installed and updates the list to associate remote control 201 with IR transmitter/receiver 207. After this update, all signals received from remote control 201 are routed to and output by IR transmitter/receiver 207.

In an alternative embodiment, each IR transmitter/receiver is fitted with a button. When television 209 is purchased and installed, the user presses this button and points remote control 201 at IR transmitter/receiver 207. Thus, signals received from remote control 201 are routed to and output by IR transmitter/receiver 207. If the user later moves television 209 to room 213, this process is repeated at IR transmitter/receiver 203 such that signals from remote control 201 are thereafter routed to IR transmitter/receiver 203.

A recent trend in home entertainment device control includes two-way communication between the device and the remote control. The remote control sends a command and the device sends a confirmation signal. In another alternative embodiment, IR transmitter/receiver 207 monitors for such a confirmation signal from television 209. If television 209 is later moved to room 213, this embodiment of the invention detects the confirmation signal from television 209 at IR transmitter/receiver 203 and updates the list accordingly.

In other embodiments, the system controller is connected to a user interface such as one provided by a personal computer. The user enters new device identifiers through this interface in much the same way as a universal remote control is initialized.

Additionally, modern home entertainment devices are now being manufactured with wired communication ports. These two-way ports are connected to a home automation system to send and receive commands and status information. In an embodiment of the invention utilizing such technology, the wired communication port is coupled to the system controller. When the system controller receives an incoming IR signal, it determines whether the corresponding device is wired to the controller and, if so, sends the data directly to the device. In such an embodiment, intelligent routing is performed without generating a second IR transmission.

Although some embodiments of the invention are stand-alone systems with a dedicated system controller designed specifically for home entertainment remote control relay, various components of such a system would be duplicative in certain building environments. For example, security systems now include a central system controller coupled to control panels located in multiple rooms.

Figure 6:
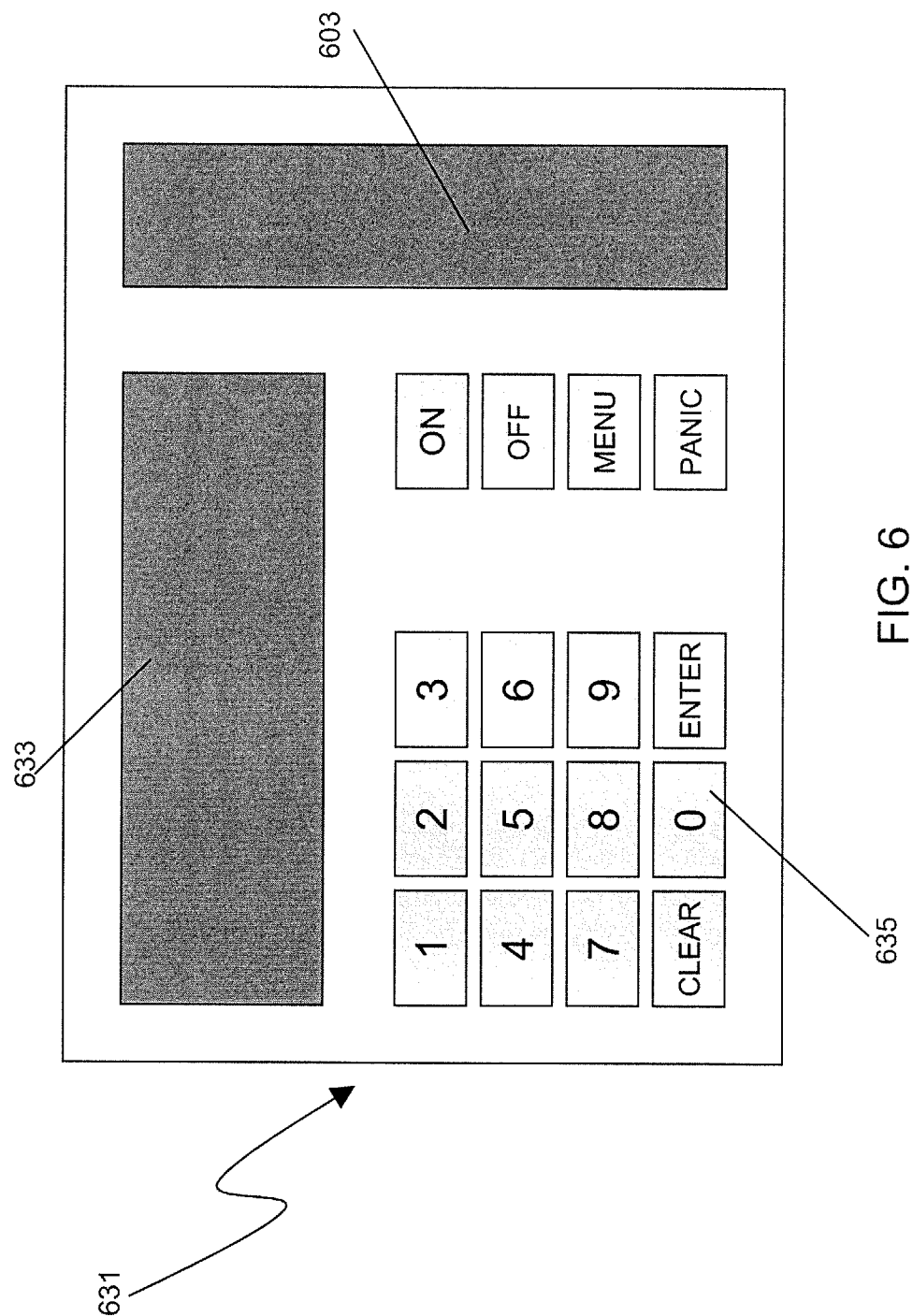
FIG. 6 illustrates a security system control panel according to one embodiment of the invention.

An example of such a control panel 631 is illustrated in FIG. 6. Control panel 631 includes a display 633 and a keypad 635. This interface is used to monitor the status of the security system and to control various functions such as arming, disarming, and customizing the system. IR communication is not unique to home entertainment device controls. IR communication is also used for short range data transfer between electronic devices. In this embodiment, security system control panel 631 includes an IR transmitter/receiver 603 whereby information such as program instructions and recorded statistics are transferred between the security system and an external computer device. The multiple distributed IR transmitter/receivers, wired (or wireless) communication infrastructure, and central system controller according to this embodiment of the invention perform the remote control relay functionality described above.

In this embodiment, referring again to FIG. 2, IR transmitter/receivers 223, 203, and 207 are security system control panels such as control panel 635. System controller 205 is the central security system controller. Depending upon the specific security system, this system controller may be located locally or remotely. For example, in some embodiments the system controller is integrated into a main security system control panel 635. In other embodiments, the control panels 635 connect to a remote server through an Internet connection or telephone line. In the latter embodiment, the remote server acts as system controller 205.

It should be understood that the invention has been described above by reference to exemplary embodiments. Other configurations and designs are possible. For example, it is understood that alternative processing systems are available to implement the system controller. Furthermore, the functionality of a system controller could be distributed as a processor within each IR transmitter/receiver. Various features and advantages of the invention are set forth in the following claims.

What is claimed is:

1. A remote control relay system for wirelessly, remote-controlled devices, the remote control relay system comprising
    a plurality of optical receivers, wherein a first optical receiver of the plurality of optical receivers receives a first optical signal from a remote control and derives encoded data from the first optical signal;
    a plurality of optical transmitters each positioned with an optical receiver of the plurality of optical receivers and each configured to generate optical signals; and
    a central controller coupled to the plurality of optical receivers and the plurality of optical transmitters through a non-optical communication network, wherein the controller is configured to
    receive encoded data from the first optical receiver,
    analyze the encoded data to identify a corresponding remote-controlled device,
    identify one optical transmitter from the plurality of optical transmitters that is positioned with an unobstructed line-of-sight to the corresponding remote-controlled device,
    route the encoded data to the one identified optical transmitter through the non-optical communication network; and
    generate a second optical signal only at the one identified optical transmitter, the second optical signal being substantially identical to the first optical signal.

2. The remote control relay system of claim 1 wherein the first optical signal and the second optical signal include pulsed infrared radiation.

3. The remote control relay system of claim 1 further comprising a plurality of security system control panels wherein each security system control panel includes one of the plurality of optical receivers and one of the plurality of optical transmitters.

4. The remote control relay system of claim 3 further comprising a central security system processor including the central controller and coupled to each of the plurality of security system control panels.

5. The remote control relay system of claim 1 wherein the first optical signal is received from one of a plurality of remote controls and one of the plurality of optical transmitters is positioned in unobstructed optical communication with a plurality of remote-controlled devices.

6. The remote control relay system of claim 1 further comprising a data storage medium containing a list of device identifiers and the corresponding optical transmitters.

7. The remote control relay system of claim 6 wherein the controller is further configured to
    derive the device identifier from the encoded data, and
    access the list in the data storage medium to identify the corresponding optical transmitter.

8. The remote control relay system of claim 6 wherein the controller is further configured to
    derive the device identifier from the encoded data,
    access the list in the data storage medium,
    identify the device identifier as previously unknown, and
    add the device identifier and the corresponding optical transmitter to the list, wherein the corresponding optical transmitter is the optical transmitter positioned with the optical receiver that derived the encoded data.

9. The remote control relay system of claim 6 further comprising an initializing button positioned with one optical receiver and one optical transmitter, wherein the controller is further configured to:

derive a new device identifier from the encoded data received while the initializing button is pressed, and add the device identifier and the corresponding optical transmitter to the list, wherein the corresponding optical transmitter is the optical transmitter positioned with the pressed initializing button.

10. The remote control relay system of claim 1 wherein the second optical signal has a higher amplitude than the first optical signal.

11. A method of controlling a wirelessly, remote-controlled device, the method comprising:

receiving a first optical signal generated by a remote control associated with the remote-controlled device at a first optical receiver of a plurality of optical receivers;

deriving encoded data from the first optical signal;

transmitting the encoded data through a non-optical communication network to a central controller connected to a plurality of optical transmitters, wherein each optical transmitter of the plurality of optical transmitters is positioned with an optical receiver of the plurality of optical receivers;

identifying one optical transmitter from the plurality of optical transmitters, wherein the one optical transmitter is positioned with an unobstructed line-of-sight to a the home entertainment device;

transmitting the encoded data through the non-optical communication network to the one identified optical transmitter; and emitting a second optical signal only from the identified optical transmitter, wherein the second optical signal is substantially identical to the first optical signal.

12. The method according to claim 11 further comprising:

deriving a device identifier from the encoded data, and accessing a list of device identifiers and corresponding optical transmitters from the plurality of optical transmitters, wherein the corresponding optical transmitter is the optical transmitter positioned with an unobstructed line-of-sight to the home entertainment device.

13. The method according to claim 12 further comprising:

identifying the device identifier as previously unknown when the identifier is not included in the list, and adding the previously unknown device identifier and the corresponding optical transmitter to the list, wherein the corresponding optical transmitter is the optical transmitter positioned with an optical receiver that derived the encoded data.

14. The method according to claim 12 further comprising:

deriving a new device identifier from the first optical signal received while an initializing button is pressed, and adding the device identifier and the corresponding optical transmitter to the list, wherein the corresponding optical transmitter is the optical transmitter positioned with the pressed initializing button.

15. The method according to claim 12 further comprising:

receiving an optical device signal at an optical receiver, wherein the optical device signal is generated from the remote-controlled device, deriving the device identifier from the optical device signal, updating the list such that the optical transmitter corresponding to the device identifier is the optical transmitter positioned with the optical receiver.

16. A security system comprising:

a plurality of security system control panels each including an infrared transmitter and an infrared receiver; and a central security system controller connected to each of the plurality of security system control panels in a non-optical communication network configured to receive the content of a first infrared signal captured by the infrared receiver of one of the plurality of security system control panels, identify one security system control panel from the plurality of security system control panels that is positioned with an unobstructed line-of-sight to a remote-controlled device based on data encoded in the first infrared signal;

communicate the content of the first infrared signal to the identified one security system control panel through the non-optical communication network, and emit a second infrared signal from the infrared transmitter of the one identified security system control panel, wherein the second infrared signal is identical to the first infrared signal.

17. The security system of claim 16 further comprising a remote computer server including the security system controller.

18. The security system of claim 16 further comprising a main security system control panel including the security system controller, an infrared transmitter, and an infrared receiver.

19. The remote control relay system of claim 1, wherein the non-optical communication network includes a wired network.

20. The remote control relay system of claim 1, wherein the non-optical communication network includes a wireless communication network.

* * * * *